United States Patent
Krebs et al.

(10) Patent No.: US 11,269,775 B2
(45) Date of Patent: Mar. 8, 2022

(54) RESPONSIVE CACHE TO IMPROVE LATENCY IN SERVICE-BASED ARCHITECTURES

(71) Applicant: SAP SE, Walldorf (DE)

(72) Inventors: Rouven Krebs, Römerberg (DE); Steffen Koenig, Heidelberg (DE)

(73) Assignee: SAP SE, Walldorf (DE)

( * ) Notice: Subject to any disclaimer, the term of this patent is extended or adjusted under 35 U.S.C. 154(b) by 73 days.

(21) Appl. No.: 16/691,829

(22) Filed: Nov. 22, 2019

(65) Prior Publication Data
US 2021/0157731 A1    May 27, 2021

(51) Int. Cl.
G06F 12/0862    (2016.01)

(52) U.S. Cl.
CPC .. G06F 12/0862 (2013.01); *G06F 2212/6022* (2013.01)

(58) Field of Classification Search
CPC ................ G06F 12/0862; G06F 2212/6022
See application file for complete search history.

(56) References Cited

U.S. PATENT DOCUMENTS

| | | | |
|---|---|---|---|
| 8,108,327 B2 | 1/2012 | Krebs | |
| 8,644,755 B2 | 2/2014 | Krebs et al. | |
| 9,584,588 B2 | 2/2017 | Mehta et al. | |
| 9,760,847 B2 | 9/2017 | Krebs et al. | |
| 2014/0051392 A1* | 2/2014 | Isomaki | H04W 12/06 455/411 |
| 2014/0359113 A1 | 12/2014 | Krebs et al. | |
| 2015/0032486 A1* | 1/2015 | Francois | G06Q 10/02 705/5 |
| 2015/0088970 A1* | 3/2015 | Wei | H04L 67/02 709/203 |
| 2015/0263977 A1* | 9/2015 | Nair | H04L 67/2852 709/226 |
| 2017/0104838 A1* | 4/2017 | Busayarat | H04L 67/32 |
| 2019/0042736 A1 | 2/2019 | Krebs et al. | |
| 2019/0042737 A1 | 2/2019 | Krebs | |
| 2019/0050376 A1 | 2/2019 | Krebs et al. | |
| 2019/0052675 A1 | 2/2019 | Krebs | |

OTHER PUBLICATIONS

U.S. Appl. No. 16/011,751, Hoke et al., filed Jun. 19, 2018.
U.S. Appl. No. 16/210,060, Krebs et al., filed Dec. 5, 2018.
U.S. Appl. No. 16/224,888, Koening et al., filed Dec. 19, 2018.
Extended European Search Report issued in European Application No. 20207393.8 dated Mar. 31, 2021, 7 pages.

* cited by examiner

*Primary Examiner* — Mark A Giardino, Jr.
(74) *Attorney, Agent, or Firm* — Fish & Richardson P.C.

(57) ABSTRACT

Methods, systems, and computer-readable storage media for receiving, by a service, a request for data, transmitting, by the service, a data request to a data source, determining, by the service, that usable data is stored within a fuzzy cache of the service, and in response: calculating supplemental data based on the usable data, and transmitting an initial response including the supplemental data, the initial response being displayed at a client that had transmitted the request for data, and receiving, by the service and from the data source, requested data in response to the request for data, and transmitting, by the service, an updated response including the requested data.

20 Claims, 5 Drawing Sheets

RESPONSIVE CACHE TO IMPROVE LATENCY IN SERVICE-BASED ARCHITECTURES

BACKGROUND

Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand. An example architecture includes microservices (also referred to as services), which have gained popularity in service-oriented architectures (SOAs). In microservice architectures, applications are composed of multiple, independent services, and are deployed in standalone containers with a well-defined interface. The services are deployed and managed by a cloud platform and run on top of a cloud infrastructure.

In microservice-based architectures, communication overhead and distributed calculations often lead to high response times (latency), performance variability, and/or reliability (availability) issues. For example, a relatively high latency can result in scenarios where a service has long response times (e.g., based on computational complexity). As another example, performance variability and/or response time peaks can occur when a suddenly high workload for a service appears. As another example, reliability issues can occur when a service breaks or is otherwise not responsive for a certain timeframe. However, users expect a responsive user interface (UI) that provides results or activity with a relatively low latency (e.g., within a few 100 ms). If one service in a microservice environment cannot fulfil these requirements, the result is a poor user experience.

SUMMARY

Implementations of the present disclosure are directed to a responsive caching platform that enables improvement in response times. More particularly, and as described in further detail herein, the responsive caching platform of the present disclosure selectively provides supplemental data that can be returned to a user with a relatively quick response time, while longer latency, requested data is retrieved from a data source. The supplemental data is subsequently replaced by the requested data once received. In some instances, the supplemental data is less accurate than the requested data.

In some implementations, actions include receiving, by a service, a request for data, transmitting, by the service, a data request to a data source, determining, by the service, that usable data is stored within a fuzzy cache of the service, and in response: calculating supplemental data based on the usable data, and transmitting an initial response including the supplemental data, the initial response being displayed at a client that had transmitted the request for data, and receiving, by the service and from the data source, requested data in response to the request for data, and transmitting, by the service, an updated response including the requested data. Other implementations of this aspect include corresponding systems, apparatus, and computer programs, configured to perform the actions of the methods, encoded on computer storage devices.

These and other implementations can each optionally include one or more of the following features: actions further include one or more of comparing an expected accuracy of the supplemental data to a threshold accuracy, wherein calculating the supplemental data is performed in response to the expected accuracy exceeding the threshold accuracy, and comparing an expected response time to a threshold response time, wherein calculating the supplemental data is performed in response to the expected response exceeding the threshold response time; the supplemental data is less accurate than the requested data; a first time lapses between receiving the request for data and transmitting the initial response and a second time lapses between receiving the request for data and transmitting the updated response, the first time being less than the second time; transmitting, by the service, the data request is executed in response to determining that data responsive to the request for data is absent from a cache of the service provider; the supplemental data is calculated based on interpolation of at least a portion of the usable data; and the fuzzy cache includes one or more of a data preparator that calculates the supplemental data, and a data reader that determines one or more of whether additional data is required from the source, and a type of data to read from the data source to optimize cache hit rate, accuracy rate, and memory consumption.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
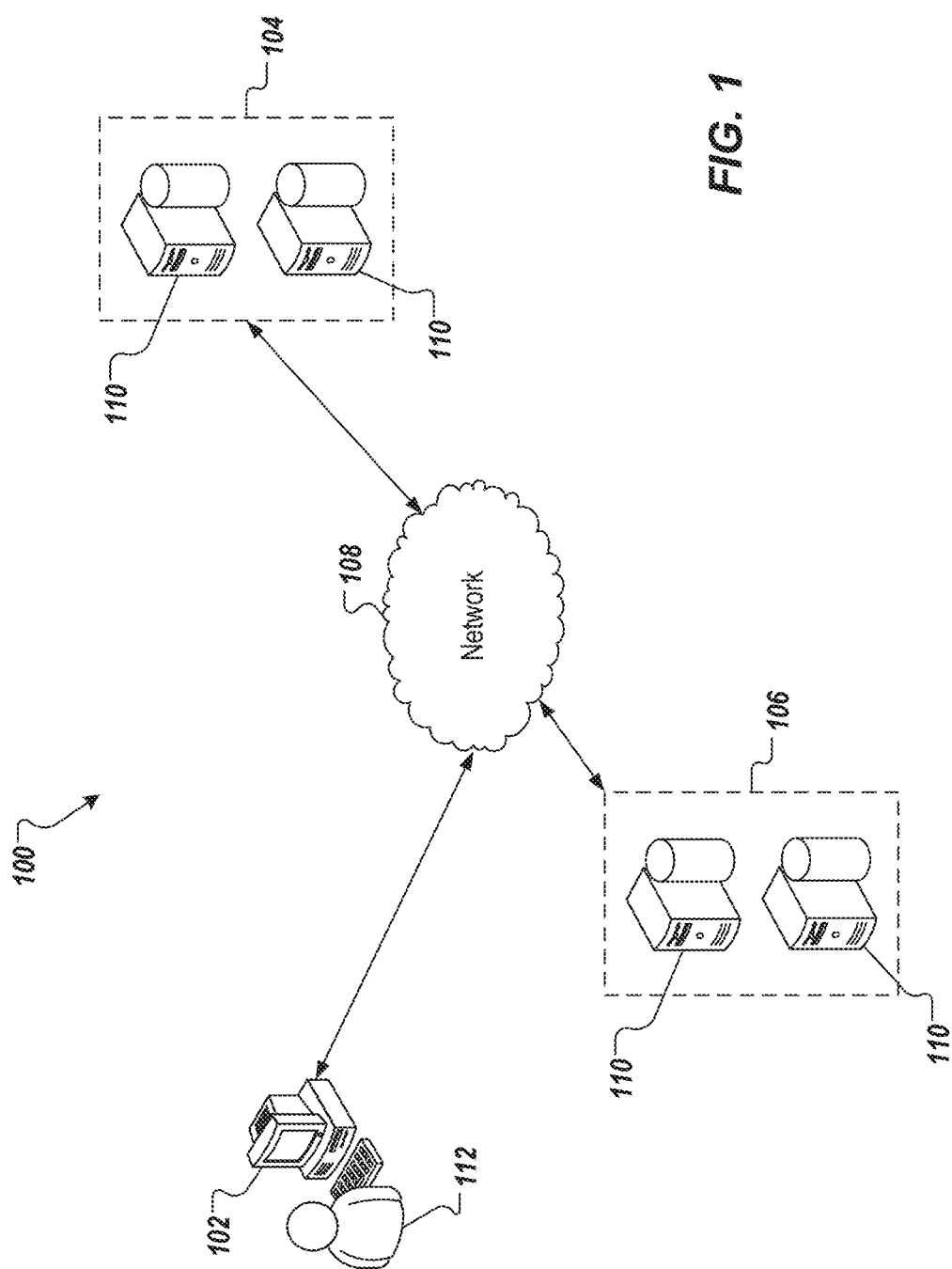
FIG. 1 depicts an example architecture that can be used to execute implementations of the present disclosure.

Implementations of the present disclosure are directed to a responsive caching platform that enables improvement in response times. More particularly, and as described in further detail herein, the responsive caching platform of the present disclosure selectively provides supplemental data that can be returned to a user with a relatively quick response time, while longer latency, requested data is retrieved from a data source. The supplemental data is subsequently replaced by the requested data once received. In some instances, the supplemental data is less accurate than the requested data. Implementations can include actions of receiving, by a service, a request for data, transmitting, by the service, a data request to a data source, determining, by the service, that usable data is stored within a fuzzy cache of the service, and in response: calculating supplemental data based on the usable data, and transmitting an initial response including the supplemental data, the initial response being displayed at a client that had transmitted the request for data, and receiving, by the service and from the data source, requested data in response to the request for data, and transmitting, by the service, an updated response including the requested data.

Implementations of the present disclosure are described in further detail with reference to an example use case that includes a cost service for determining a cost of operation of one or more components for a software system executing in a cloud-computing system (e.g., an infrastructure-as-a-service (IaaS) system) provided by a third-party service provider (e.g., Amazon Web Services (AWS), Microsoft Azure).

In the example use case, a client-side user interface (client UI) is provided to access the cost service. A user can request the cost for the one or more components for the software system executing in the cloud-computing system. For example, the user can send an identifier that uniquely identifies a component (e.g., a virtual machine (VM)) and the timeframe of interest (e.g., time range, date range) to the cost service. In response to the request, the cost service retrieves cost relevant artefacts from the identified software system. Example artefacts can include, without limitation, a list of VMs, volumes, IP addresses, and the like. This list of artefacts is sent together with the requested timeframe to the third-party service provider. For example, the third-party service provider can expose a cost application programming interface (API), through which a cost request can be provided. The cost API returns the costs of these artefacts for the given timeframe, and the cost service returns the cost information to the client.

Although the example use case is referenced to illustrate implementations of the present disclosure, it is contemplated that implementations of the present disclosure can be realized in any appropriate use case. For example, implementations of the present disclosure can be realized in any appropriate use case, in which data is requested from a data source.

To provide further context for implementations of the present disclosure, and as introduced above, cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand. An example architecture includes microservices, which have gained popularity in service-oriented architectures (SOAs). In microservice architectures, applications are composed of multiple, independent services, and are deployed in standalone containers with a well-defined interface. The services are deployed and managed by a cloud platform and run on top of a cloud infrastructure.

In microservice-based architectures, communication overhead and distributed calculations often lead to high response times (latency), performance variability, and/or reliability (availability) issues. For example, a relatively high latency can result in scenarios where a service has long response times (e.g., based on computational complexity). As another example, performance variability and/or response time peaks can occur when a suddenly high workload for a service appears. As another example, reliability issues can occur when a service breaks or is otherwise not responsive for a certain timeframe. However, users expect a responsive UI that provides results or activity with a relatively low latency (e.g., within a few 100 ms). If one service in a microservice environment cannot fulfil these requirements, the result is a bad user experience.

Traditional caching could be considered as an approach in resolving these issues. However, traditional caching will not be effective, because the cache hit rate will be too low for continuously changing/adapted selection criteria. That is, the cache hit rate will be relatively low for dynamic requests for data. The cache hit rate refers to a number of times the cache actually stores and can provide the data being requested. In scenarios where user-submitted parameters of requests can frequently and quickly change, it will occur more often that the cache does not include the data that is responsive to the re-submitted parameters.

In the example use case, a concrete problem is a relatively high latency in receiving the cost information from the third-party service provider. For example, the call to the third-party service provider can take approximately 4 seconds. This is too much time for an interactive UI where the user may frequently adjust parameters (e.g., the timeframe, the identifier of the component(s) of the software system). As discussed above, traditional caching will not work, because the cache hit rate will be too low for continuously changing/adapted selection criteria. For example, if the user changes the timeframe and/or the system identifier, the cache will likely not include the cost information calculated based on the changed timeframe/identifier, which would result in a cache miss.

In view of the above context, implementations of the present disclosure provide a responsive caching platform that enables improvement in response times. More particularly, and as described in further detail herein, the responsive caching platform of the present disclosure selectively provides supplemental data that can be returned to a user with a relatively quick response time, while longer latency, requested data is retrieved from a data source. The data source can include any appropriate data source (e.g., file, database, computer-memory, human-based response). The supplemental data is subsequently replaced by the requested data once received. In some instances, the supplemental data is less accurate than the requested data.

FIG. 1 depicts an example architecture 100 in accordance with implementations of the present disclosure. In the depicted example, the example architecture 100 includes a client device 102, server systems 104, 106, and a network 108. Each of the server systems 104, 106 includes one or more server devices and databases 110 (e.g., processors, memory). In the depicted example, a user 112 interacts with the client device 102.

In some examples, the client device 102 can communicate with the server system 104 over the network 110. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server systems 104, 106 each includes at least one server and at least one data store. In the example of FIG. 1, the server systems 104, 106 are intended to represent various forms of servers including, but not limited to a web server, an application server, a proxy server, a network server, and/or a server pool. In general, server systems accept requests for application services and provides such services to any number of client devices (e.g., the client device 102 over the network 110).

In accordance with implementations of the present disclosure, the server system 104 can host a service, through which data can be requested. In some examples, the server system 106 can host a data source, from which data that is requested is provided. For example, the user 112 can request data by submitting a request to the service hosted on the server system 104 through the client device 102. The service can request the data from the server system 106.

To illustrate this, and with reference to the non-limiting example use case, the server system 104 can host a cost service, through which the user 112 can request a cost for execution of one or more components of a software system within a third-party cloud-computing environment. The server system 106 can provide the cloud-computing environment of the third-party. In this example, the user 112 can submit a request for the cost through a UI displayed by the computing device 102. For example, the user 112 can input an identifier of a component of the software system and a timeframe (e.g., range of days, months, weeks, years) through the UI. The request is provided to the cost service hosted on the server system 104. In some instances, the cost service provides a cost request to the server system 106, which provides a cost response back to the cost service. The cost service provides the cost request to the client device 102 for display to the user 112 in the UI.

As introduced above, the responsive caching platform of the present disclosure provides supplemental data (also referred to as initial results) that can be returned to a user with a relatively quick response time, while longer latency, requested data (also referred to as updated results) are retrieved from a data source. The supplemental data is subsequently replaced by the requested data once received. In some instances, the supplemental data is less accurate than the requested data. For example, and with continued reference to FIG. 1, the server system 104 can determine whether data that is responsive to a request received from the client device 102 is available in a cache. If the data is available, the server system 104 can provide a response including the data. If the data is not available, and in accordance with implementations of the present disclosure, the server system 104 can determine supplemental data, and can provide a response including the supplemental data. Concurrently, the server system 104 can request data from the server system 106 and receives requested data in response. The server system 104 provides an updated response to the client device 102 including the requested data. In some examples, the requested data is more accurate than the supplemental data that is initially provided to the client device 102.

Figure 2:
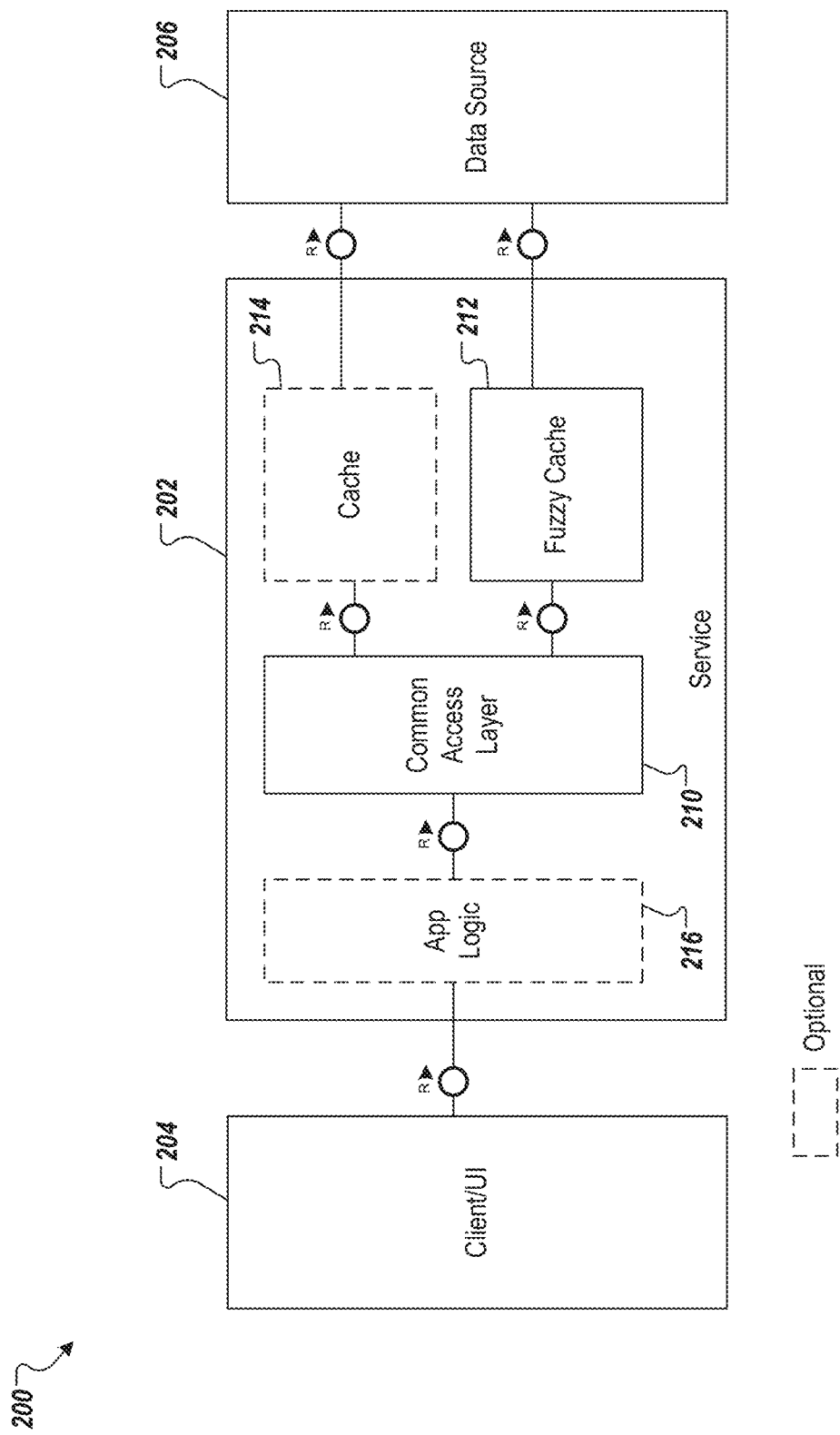
FIG. 2 depicts an example conceptual architecture in accordance with implementations of the present disclosure.

FIG. 2 depicts an example conceptual architecture 200 in accordance with implementations of the present disclosure. In the depicted example, example conceptual architecture 200 includes a service 202, a client/UI 204, and a data source 206. In some implementations, the service 202 can receive a request from the client/UI 204. In some examples, the service 202 can determine whether data that is responsive to the request is available locally (i.e., within the service 202). If the requested data is available, the service 202 can provide a response including the requested data. If the requested data is not available, and in accordance with implementations of the present disclosure, the service 202 can determine supplemental data, as described in further detail herein. The service 202 can provide an initial response including the supplemental data to the client/UI 204. In this manner, the client/UI 204 can display the supplemental data to a user that had submitted the request. Concurrently, the service 202 requests data from the data source 206. The data source processes the request and returns requested data to the service 202. The service 202 provides an updated response to the client/UI 204 including the requested data. In some examples, the requested data is more accurate than the supplemental data that was initially provided to the client/UI 204.

In further detail, and in the example of FIG. 2, the service 202 includes a common access layer (CAL) 210 and a fuzzy cache 212. In some examples, the CAL 210 provides a facade for accessing data from the data source 206. In some implementations, and as described in further detail herein, in response to receiving a request, the CAL 210 initiates a data request and a supplemental data request. In some examples, the data request is transmitted to the data source 206. In some examples, the supplemental data request is transmitted to the fuzzy cache 212. As described in detail herein, the fuzzy cache 212 can be used to provide the supplemental data that is included in the initial response to the client/UI 204. For example, in response to the request for supplemental data from the CAL 210, the fuzzy cache 210 can determine whether data is available within the fuzzy cache 210 that can be used to calculate supplemental data. If data is available within the fuzzy cache 210 that can be used to calculate supplemental data, the fuzzy cache 210 calculates the supplemental data and provides the supplemental data to the CAL 210. The CAL 210 provides an initial response that includes the supplemental data back to the client/UI 204.

As described herein, the supplemental data is provided based on data available in the fuzzy cache 212, which data might not be the most recent and/or accurate data that is responsive to the request. However, the initial response including the supplemental data can be provided quickly (e.g., approximately 100 ms) relative to the time that is required to retrieve data from the data source 206 (e.g., multiple seconds). In some examples, once the CAL 210 receives the requested data from the data source 206, the CAL 210 sends an updated response to the client/UI 204, the updated response including the requested data.

In some implementations, the CAL 210 can provide statistical information about the expected accuracy of the supplemental data with the initial response. In some examples, the CAL 210 can provide an accuracy estimate based on historical data. For example, after the CAL 210 receives the requested data from the data source 206, the CAL 210 can compare the supplemental data that has been initially provided to the requested data to evaluate an accuracy of the supplemental data. In some examples, the CAL 210 can record accuracies of supplemental data over time and provide the accuracy estimate based on the recorded accuracies (e.g., calculate the accuracy estimate as an average of the recorded accuracies).

By way of non-limiting example, the supplemental data can include an estimated cost (e.g., $56) determined by the fuzzy cache 212 and the data later returned from the data source 206 can include an actual cost (e.g., $64). An example accuracy for this example can be determined based on a percentage (e.g., the supplemental data was 87.5% accurate). In some examples, multiple accuracies of the supplemental data of estimated costs can be determined (e.g., 87.5%, 93.5%, 98%) and an accuracy estimate (e.g., an average accuracy of 93%) can be calculated. In some examples, the accuracy estimate can be provided as a range (e.g., ±5%). In some examples, the accuracy estimate is provided with the supplemental data included in an initial response.

In some implementations, potential accuracy can be determined based on the data used by the fuzzy cache 212 (e.g., hardcoded rules), or based on historical information also from other data not directly related to the requested VM. In some implementations, potential accuracy can be determined based on the request parameters (e.g., timeframe, where, for example, the difference between the requested timeframe and the timeframe of the data persisted can be used to determine the accuracy). In some implementations, statistical methods and/or machine learning (ML) can be used.

In some implementations, the service 202 can optionally include (as represented in dashed line) a cache 214. In some examples, the cache 214 stores data retrieved from the data source 206. That is, the cache 214 can be considered a traditional cache that temporarily stores requested data received from the data source 206. In cases, in which the cache 214 is included, the CAL 210 checks the cache 214 for the requested data in response to receiving a request from the client/UI 204. If the cache 214 includes the requested data, the requested data is returned to the client/UI 204. If, however, the cache 214 does not include the requested data, the CAL 210 initiates the data request and the supplemental data request.

In some examples, the service 202 can optionally include (as represented in dashed line) application logic 216. In some examples, the application logic 216 can include functionality for calculating costs of infrastructure component or (automatically) optimizing system deployments (e.g., number of instances). In some examples, the application logic 216 may access any appropriate type of timeseries data, where a fast response is preferred, as opposed to perfect accuracy in the first place (e.g., whenever an automated optimization approaches fitness function is based on a timeseries information, it may already stop the current optimization path when the predicted result is bad to increase speed).

Figure 3:
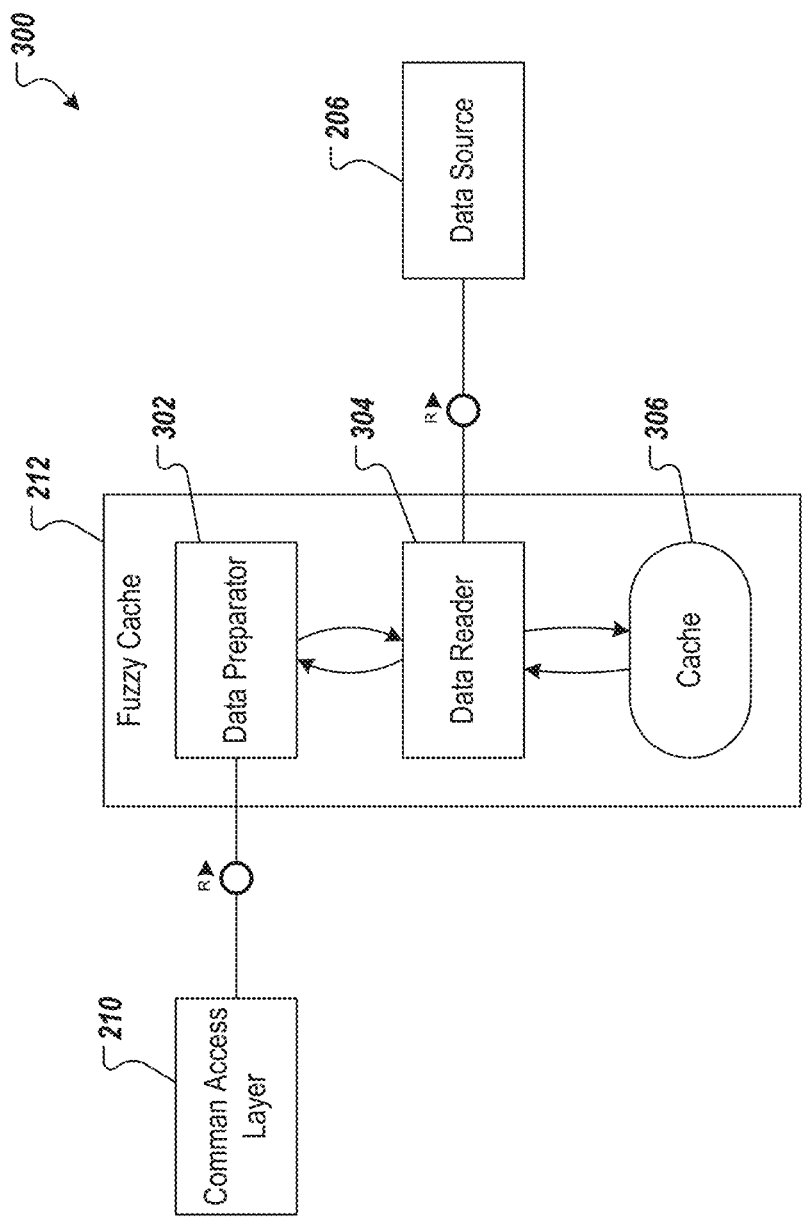
FIG. 3 depicts further detail of the example conceptual architecture of FIG. 2 in accordance with implementations of the present disclosure.

FIG. 3 depicts further detail of the example conceptual architecture of FIG. 2 in accordance with implementations of the present disclosure. More particularly, FIG. 3 depicts the data source 206, the CAL 210, and the fuzzy cache 212. In the example of FIG. 3, the fuzzy cache 212 includes a data preparator 302, a data reader 306, and a cache 306. In some examples, the fuzzy cache 212 persists data in the cache 306, which data can be used to calculate supplemental data in response to a request (e.g., from the client/UI 206).

In some implementations, the data preparator 302 executes logic to determine whether data is available within the cache 306 that can be used to calculate supplemental data. In some examples, whether data is available within the cache 306 that can be used to calculate supplemental data can be determined based on whether the data in the cache is usable to provide a semantically correct response to the request.

For example, and continuing with the example use case, the request can include a request for cost of execution of a particular VM (e.g., VM1). The data preparator 302 can check (e.g., through the data reader 304) whether the cache 306 stores any cost data for the particular VM. If the cache 306 is absent cost data for the particular VM, it can be determined that data is not available within the cache 306 that can be used to calculate supplemental data. If the cache 306 stores cost data for the particular VM, it can be determined that data is available within the cache 306 that can be used to calculate supplemental data.

As another example, the request can include a request for cost of execution of a particular VM (e.g., VM1) over a particular timeframe (e.g., the first two quarters of 2019). As in the example above, the data preparator 302 can check (e.g., through the data reader 304) whether the cache 306 stores any cost data for the particular VM. If the cache 306 is absent cost data for the particular VM, it can be determined that data is not available within the cache 306 that can be used to calculate supplemental data. If the cache 306 stores cost data for the particular VM, it can be determined whether the data is usable in view of the requested timeframe. For example, the cost data for the particular VM that is stored within the cache 306 can include cost data for the year of 2019 (e.g., VM1|Year 2019|$3458). In some examples, a granularity of the request can be compared to a level of abstractness of the cost data to determine whether supplemental data is to be calculated. Continuing with the example above, the granularity of the request can be considered 6 months and the abstractness of the cost data can be considered one year. In view of this, it can be determined that the cost data is usable in view of the requested timeframe. As a counter-example, if the granularity of the request was something very specific (e.g., 9 AM-5PM on Tuesday, Jun. 4, 2019), it can be determined that the cost data is not usable in view of the abstractness of the cost data.

In some implementations, besides hard-coded rules based on specific domain knowledge, any appropriate statistical or automated approach (e.g., ML) can be leveraged to learn over time what granularity/abstraction is the most useful. As base metric for this optimization, the prediction accuracy can be leveraged. Such a learning could be based on live data online. In some instances, such a learning might be done offline for a particular dataset of the data source collected in the past and optimized against expected requests (e.g., simulating many requests). Combinations of online and offline approaches are possible. Additional information from, for example, calendars (e.g., if request is for a public holiday) or other meta information from external sources can be interpreted. For example, using ML or hard coded rules (e.g., <on public holidays never use the fuzzy cache>).

In some implementations, if data is not available in the cache 306 or data that is available in the cache is not usable for calculating supplemental data in response to the request, a generic data request can be provided to the data source 206. In some examples, the generic data request is transmitted to request data at a more abstract level than the granularity of the request. For example, and in terms of time, if the granularity of the request is a week, the generic data request can request data for a month. As another example, if the granularity of the request is a month, the generic data request can request data for a quarter (e.g., three months). As another example, if the granularity of the request is a quarter, the generic data request can request data for a year (e.g., four quarters). In some instances the abstraction dataset might be smaller than the requested timeframe (e.g., cached data for one week but request for two weeks.)

As described herein, if data is available within the cache 306 that can be used to calculate supplemental data, data is retrieved from the cache 306 through the data reader 304, and the data preparator 302 calculates the supplemental data. In some implementations, calculation of the supplemental data can be performed using one or more mathematical approaches. For example, linear regression can be used on the data stored in the cache 306 to calculate the supplemental data, as described in further detail below by way of non-limiting example. In some implementations, calculation of the supplemental data can be performed using one or more machine-learning (ML) models. For example, a ML model can be trained based on historical data to process usable data within the cache 306 and can provide the supplemental data as output.

Implementations of the present disclosure are described in further detail herein by way of non-limiting example. In this example, a request is received requesting cost data for a particular VM during the month of June 2019. For example, the request (R) can include an identifier uniquely identifying the VM and can include the time frame (e.g., R=[cost, VM1, 06.2019]). It can be provided that VM1 is typically operated on a weekly schedule of 9 AM-5PM each day of the week at a cost of $1 per hour. Accordingly, per the weekly schedule for VM1, cost would be expected to be $56 per week. In this example, however, it can occur that, for several weeks in 2019, VM1 ran an additional 8 hours, which would result in an actual cost of $64 per week for those weeks.

In response to receiving the request, a request for the cost data can be transmitted to a data source. Concurrently, it can be determined whether the fuzzy cache includes data that can be used to provide supplemental data in an initial response, while waiting for return of the actual data. In this example, it can be determined that the fuzzy cache stores the following data:

| VM ID | TIMEFRAME | COSTS |
| --- | --- | --- |
| VM1 | 1. Jan. 2019-31. Dec. 2019 | $3458 |
| VM2 | 1. Jan. 2019-31. Dec. 2019 | $1524 |
| VM3 | 1. Jan. 2019-31. Dec. 2019 | $2950 |
| VM3 | 1. Jan. 2019-7. Jan. 2019 | $168 |

In response to the request for the cost of VM1 in June 2019, the data preparator of the fuzzy cache can process the data from the complete year 2019 for VM1. In this example, the data preparator can estimate the cost for June 2019 by using a interpolation to calculate the supplemental data. For example:

$3458/365d*30d=$284.22

Consequently, the data preparator can provide supplemental data of $284.22, which can be provided in an initial response to the request. For example, a value of $284.22 is initially displayed to a user in a UI upon receiving the initial response that includes the supplemental data.

In some examples, it can occur that multiple data points (e.g., day0=$0, day100=$20, day120=$45, day365=$3458) are provided. In such cases, any appropriate interpolation method between these points or any appropriate regression method between these points can be used.

However, and as noted above, there were several weeks in 2019, during which VM1 was running longer (e.g., at a cost of $64 per week). Because the supplemental data is calculated based on a linear regression over the entire year of 2019, the supplemental data accounts for increased costs that occurred outside of June 2019. That is, the supplemental data includes some error.

In accordance with implementations of the present disclosure, the requested data is received from the data source. That is, the data source provides the requested data for VM1 for June 2019, which includes the actual cost. An updated response is provided an includes the requested data (e.g., the actual cost). In this example, the requested data can include an actual cost of $240. The UI can be updated to replace the initially displayed value of $284.22 with the actual value $240. In this example, VM1 ran at the expected schedule of 8 hours per day in June 2019 with an additional uptime of 16 hours (e.g., VM1 ran for an additional 8 hours two days in June 2019). Consequently, the supplemental data had an error of $28.22 (e.g., +11%).

In some implementations, whether an initial response using the fuzzy cache is to be provided can be determined based on client-defined requirements that can be included in the request. Example requirements can include, without limitation, a response time requirement, a fuzzy cache requirement, an accuracy requirement.

For example, and with respect to the response time requirement, the client/UI can include a response time requirement within the request, the response time requirement indicating a maximum response time (e.g., R=[cost, VM1, 06.2019, resp_time<200 ms]). In some examples, whether the fuzzy cache is to be used is determined based on the response time requirement. For example, the CAL can determine that a response time to retrieve requested data from the data source would exceed the response time requirement. Consequently, the CAL would request supplemental data from the fuzzy cache and provide an initial response. As another example, the CAL can determine that a response time to retrieve requested data from the data source would not exceed the response time requirement. Consequently, the CAL would request data from the data source and forego supplemental data from the fuzzy cache.

In some examples, the fuzzy cache requirement can indicate whether the fuzzy cache is to be used. For example, the client/UI can include a fuzzy cache requirement within the request, the fuzzy cache requirement indicating whether the fuzzy cache is to be used (e.g., R=[cost, VM1, 06.2019, fuzzy_cache=YES). For example, if the fuzzy cache requirement indicates that the fuzzy cache is to be used (e.g., fuzzy_cache=YES), the fuzzy cache is used to provide supplemental data in an initial response (assuming usable data is available in the fuzzy cache). However, if the fuzzy cache requirement indicates that the fuzzy cache is not to be used (e.g., fuzzy_cache=NO), the fuzzy cache is not used.

In some implementations, whether the fuzzy cache is to be used is determined based on the response time requirement and on the fuzzy cache requirement indicating that the fuzzy cache is to be used.

In some examples, the accuracy requirement can indicate a minimum accuracy for supplemental data to determine whether the fuzzy cache is to be used. For example, the client/UI can include an accuracy requirement within the request, the accuracy requirement indicating whether the fuzzy cache is to be used (e.g., R=[cost, VM1, 06.2019, accuracy_fuzzy_cache>90%). For example, if the accuracy estimate, described in detail above, exceeds the accuracy requirement, the fuzzy cache is used to provide supplemental data in an initial response (assuming usable data is available in the fuzzy cache). However, if the accuracy estimate does not exceed the accuracy requirement, the fuzzy cache is not used.

In some examples, the accuracy requirement can indicate an acceptable accuracy to determine whether a request to the data source is required. For example, the client/UI can include an acceptable accuracy to determine whether a request to the data source is required (e.g., R=[cost, VM1, 06.2019, accuracy_fuzzy_cache=90%). For example, if the accuracy estimate, described in detail above, exceeds the accuracy requirement, a request to the data source is foregone. Instead, the fuzzy cache is used to provide supplemental data in an initial response (assuming usable data is available in the fuzzy cache), but no update response is provided. That is, the supplemental data is considered to be sufficiently accurate, so requested data from the data source is not required. However, if the accuracy estimate does not exceed the accuracy requirement, a request is sent to the data source, as described herein. In some examples, the fuzzy cache is used to provide the initial response with supplemental data pending receipt of the requested data and issuance of an updated response, as described herein.

Figure 4:
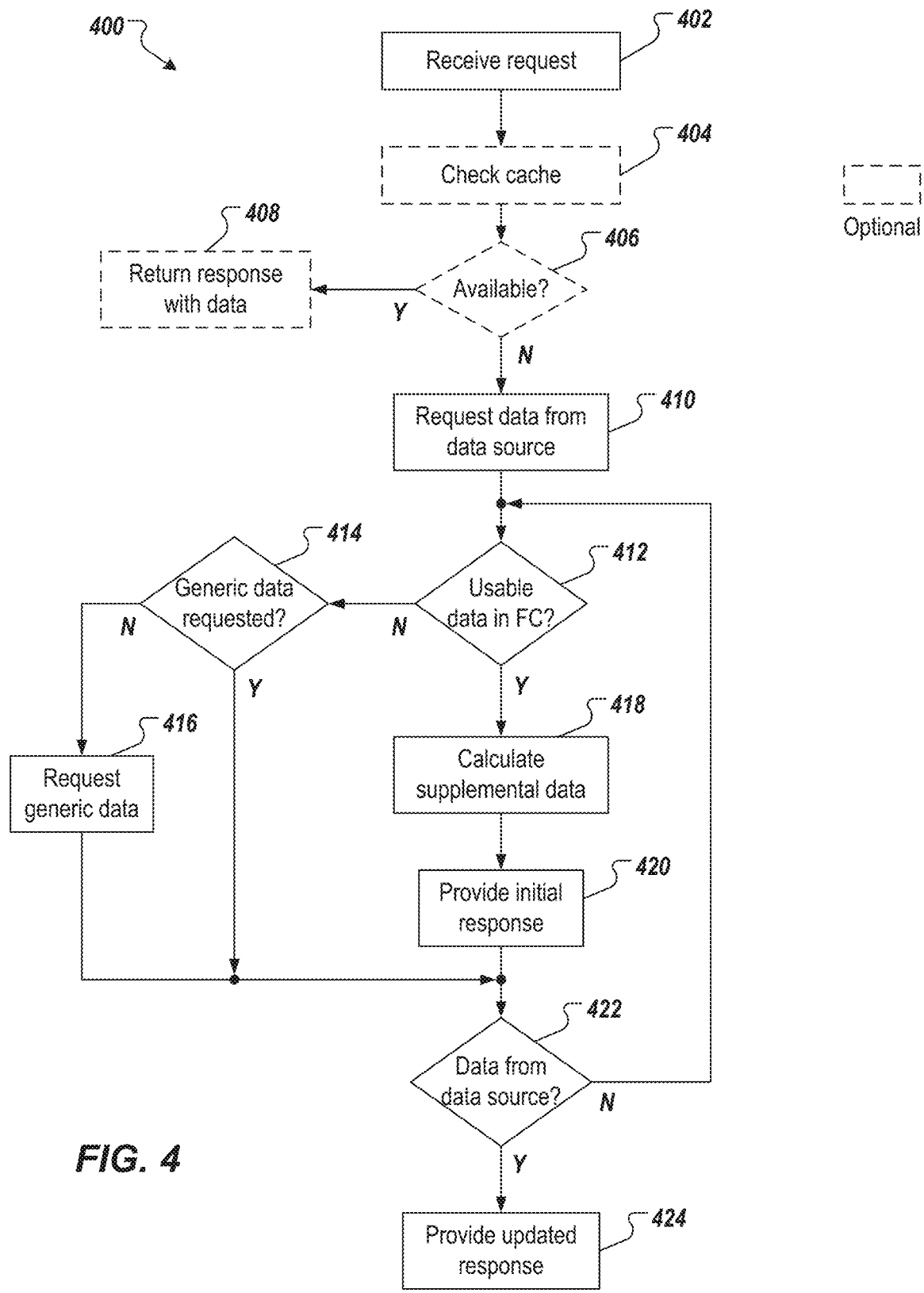
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

A request is received (402). For example, the service 202 receives a request for data, the request including one or more parameters representing requested data. In some examples, the request is received from the client/UI 204 (e.g., a user inputting a request through the client/UI 204). In the example user case, the request can include a request for a cost of executing a component (e.g., a VM) of a software system within a cloud-computing environment over a specified period of time. In some examples, a cache is checked for the requested data (404). For example, in scenarios where the service 202 includes the cache 214, the cache 214 is checked to determine whether the requested data is stored therein. It is determined whether the requested data is available in the cache (406). If the requested data is within the cache, a response is returned with the requested data (408) and the example process 400 ends.

If the requested data is within the cache, or the scenario is such that the service 202 does not include the cache 214, data is requested from a data source (410). For example, the service 202 transmits a request to the data source 206. Continuing with the example use case, the data source 206 can include the third-party that provides the cloud-computing environment, within which the component of the software system executes.

It is determined whether usable data is stored within the fuzzy cached (FC) (412). That is, and as described herein, it is determined whether there is data in the fuzzy cache that can be used to calculate supplemental data. If it is determined that there is not data in the fuzzy cache that can be used to calculate a supplemental response (e.g., the request is for VM1, the fuzzy cache only has data for VM3), it is determined whether generic data has been requested (414). If generic data has not been requested, a request for generic data is transmitted to the data source (416). For example, and as described herein, the generic data request is transmitted to request data at a more abstract level than the granularity of the request. For example, and in terms of time, if the granularity of the request is a week, the generic data request can request data for a month.

If it is determined that there is data in the fuzzy cache that can be used to calculate supplemental data, the supplemental data is calculated (418). For example, and as described herein, calculation of the supplemental data can be performed using one or more mathematical approaches (e.g., linear regression) or using one or more ML models. An initial response is provided (420). That is, and as described herein, during pendency of a response with actual data from the data source, an initial response is provided that includes the supplemental data. In this manner, the request is responded to with relatively low latency even though the supplemental data can include some level of error.

It is determined whether the requested data is received from the data source (422). That is, for example, it is determined whether the service 202 has received the requested data back from the data source 206, the requested data providing the actual data requested. For example, and continuing with the example use case, the requested data includes data indicating the actual cost for execution of the component during the specified timeframe. If the requested data has not yet been received, the example process 400 loops back. If the requested data has been received, an updated response is provided (424). For example, and as described herein, the updated response includes the requested data and is provided by the service 202 back to the client/UI 204, which can update the UI based on the requested data.

Figure 5:
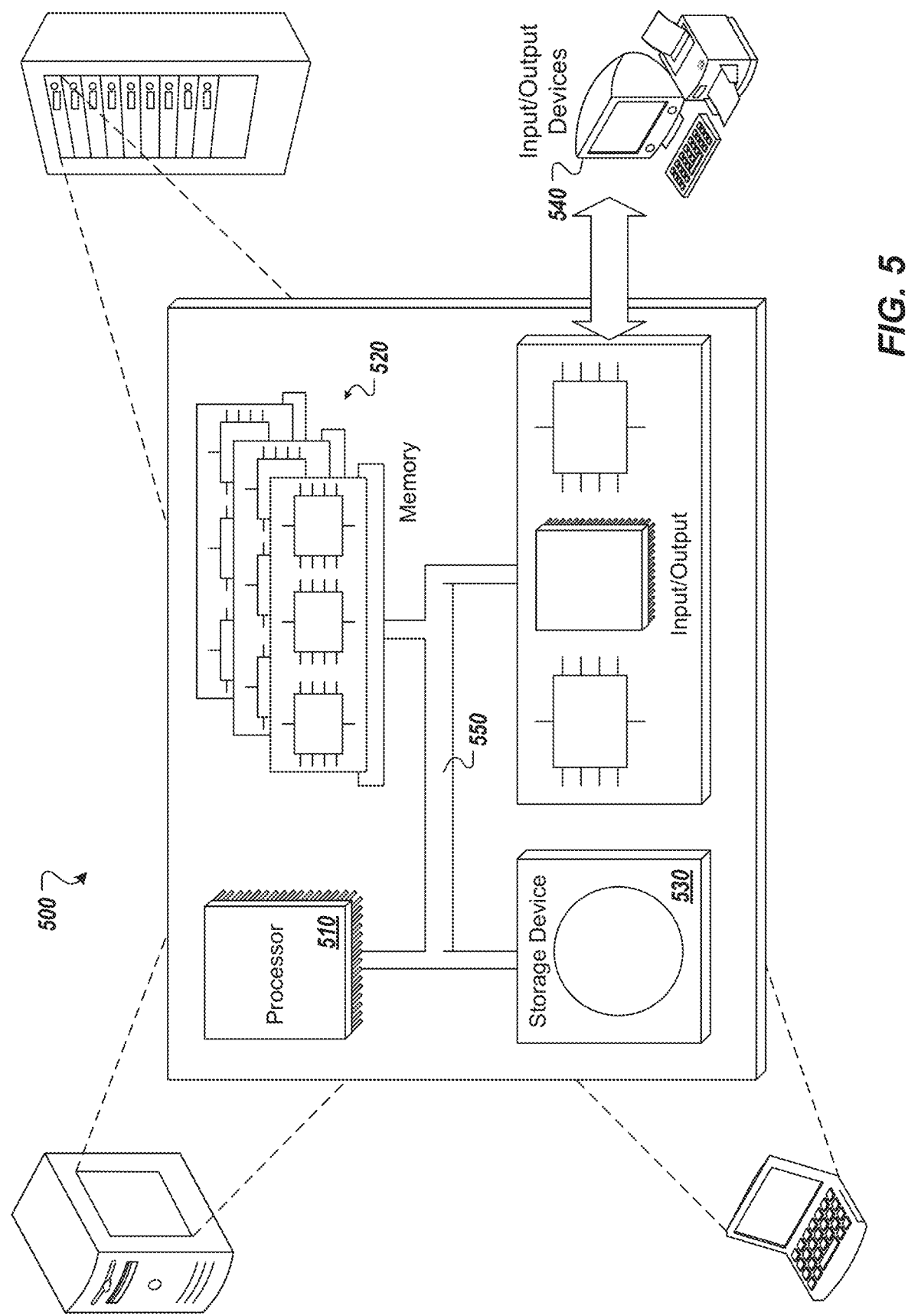
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device.

The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for responding to requests for data, the method being executed by one or more processors and comprising:
receiving, by a service, a request for data;
transmitting, by the service, a data request to a data source, the request comprising data indicative of a component of a software system and data indicative of a cost of executing the component over a timeframe;
determining, by the service, that usable data is stored within a fuzzy cache of the service based on the request, and in response:
calculating supplemental data based on the usable data, the supplemental data being indicative of an estimated cost of executing the component over the timeframe, and
transmitting an initial response comprising the supplemental data, the initial response being displayed at a client that had transmitted the request for data;
receiving, by the service and from the data source, requested data in response to the request for data, the requested data being indicative of an actual cost of executing the component over the timeframe; and
transmitting, by the service, an updated response comprising the requested data to replace the supplemental data with the requested data.

2. The method of claim 1, further comprising one or more of:
comparing an expected accuracy of the supplemental data to a threshold accuracy, wherein calculating the supplemental data is performed in response to the expected accuracy exceeding the threshold accuracy; and
comparing an expected response time to a threshold response time, wherein calculating the supplemental data is performed in response to the expected response time exceeding the threshold response time.

3. The method of claim 1, wherein the supplemental data is less accurate than the requested data.

4. The method of claim 1, wherein a first time lapses between receiving the request for data and transmitting the initial response and a second time lapses between receiving the request for data and transmitting the updated response, the first time being less than the second time.

5. The method of claim 1, wherein transmitting, by the service, the data request is executed in response to determining that data responsive to the request for data is absent from a cache of the service provider.

6. The method of claim 1, wherein the supplemental data is calculated based on interpolation of at least a portion of the usable data.

7. The method of claim 1, wherein the fuzzy cache comprises one or more of a data preparator that calculates the supplemental data, and a data reader that determines one or more of whether additional data is required from the source, and a type of data to read from the data source to optimize cache hit rate, accuracy rate, and memory consumption.

8. A non-transitory computer-readable storage medium coupled to one or more processors and having instructions stored thereon which, when executed by the one or more processors, cause the one or more processors to perform operations for responding to requests for data, the operations comprising:
 receiving, by a service, a request for data, the request comprising data indicative of a component of a software system and data indicative of a cost of executing the component over a timeframe;
 transmitting, by the service, a data request to a data source;
 determining, by the service, that usable data is stored within a fuzzy cache of the service based on the request, and in response:
  calculating supplemental data based on the usable data, the supplemental data being indicative of an estimated cost of executing the component over the timeframe, and
  transmitting an initial response comprising the supplemental data, the initial response being displayed at a client that had transmitted the request for data;
 receiving, by the service and from the data source, requested data in response to the request for data, the requested data being indicative of an actual cost of executing the component over the timeframe; and
 transmitting, by the service, an updated response comprising the requested data to replace the supplemental data with the requested data.

9. The computer-readable storage medium of claim 8, wherein operations further comprise one or more of:
 comparing an expected accuracy of the supplemental data to a threshold accuracy, wherein calculating the supplemental data is performed in response to the expected accuracy exceeding the threshold accuracy; and
 comparing an expected response time to a threshold response time, wherein calculating the supplemental data is performed in response to the expected response exceeding the threshold response time.

10. The computer-readable storage medium of claim 8, wherein the supplemental data is less accurate than the requested data.

11. The computer-readable storage medium of claim 8, wherein a first time lapses between receiving the request for data and transmitting the initial response and a second time lapses between receiving the request for data and transmitting the updated response, the first time being less than the second time.

12. The computer-readable storage medium of claim 8, wherein transmitting, by the service, the data request is executed in response to determining that data responsive to the request for data is absent from a cache of the service provider.

13. The computer-readable storage medium of claim 8, wherein the supplemental data is calculated based on interpolation of at least a portion of the usable data.

14. The computer-readable storage medium of claim 8, wherein the fuzzy cache comprises one or more of a data preparator that calculates the supplemental data, and a data reader that determines one or more of whether additional data is required from the source, and a type of data to read from the data source to optimize cache hit rate, accuracy rate, and memory consumption.

15. A system, comprising:
 a computing device; and
 a computer-readable storage device coupled to the computing device and having instructions stored thereon which, when executed by the computing device, cause the computing device to perform operations for natural language explanations for responding to requests for data, the operations comprising:
  receiving, by a service, a request for data, the request comprising data indicative of a component of a software system and data indicative of a cost of executing the component over a timeframe;
  transmitting, by the service, a data request to a data source;
  determining, by the service, that usable data is stored within a fuzzy cache of the service based on the request, and in response:
   calculating supplemental data based on the usable data, the supplemental data being indicative of an estimated cost of executing the component over the timeframe, and
   transmitting an initial response comprising the supplemental data, the initial response being displayed at a client that had transmitted the request for data;
  receiving, by the service and from the data source, requested data in response to the request for data, the requested data being indicative of an actual cost of executing the component over the timeframe; and
  transmitting, by the service, an updated response comprising the requested data to replace the supplemental data with the requested data.

16. The system of claim 15, wherein operations further comprise one or more of:
 comparing an expected accuracy of the supplemental data to a threshold accuracy, wherein calculating the supplemental data is performed in response to the expected accuracy exceeding the threshold accuracy; and
 comparing an expected response time to a threshold response time, wherein calculating the supplemental data is performed in response to the expected response exceeding the threshold response time.

17. The system of claim 15, wherein the supplemental data is less accurate than the requested data.

18. The system of claim 15, wherein a first time lapses between receiving the request for data and transmitting the initial response and a second time lapses between receiving the request for data and transmitting the updated response, the first time being less than the second time.

19. The system of claim 15, wherein transmitting, by the service, the data request is executed in response to determining that data responsive to the request for data is absent from a cache of the service provider.

20. The system of claim 15, wherein the supplemental data is calculated based on interpolation of at least a portion of the usable data.

* * * * *